(12) United States Patent
Kaneki et al.

(10) Patent No.: US 9,110,288 B2
(45) Date of Patent: Aug. 18, 2015

(54) MICROSCOPE

(71) Applicant: OLYMPUS CORPORATION, Shibuya-ku, Tokyo (JP)

(72) Inventors: Shinsuke Kaneki, Akiruno (JP); Yasuko Ishii, Tama (JP); Kazuki Murata, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/229,062

(22) Filed: Mar. 28, 2014

(65) Prior Publication Data

US 2014/0293411 A1  Oct. 2, 2014

(30) Foreign Application Priority Data

Mar. 29, 2013  (JP) ................................. 2013-072332

(51) Int. Cl.
| | |
|---|---|
| *G02B 21/00* | (2006.01) |
| *G02B 21/06* | (2006.01) |
| *G02B 21/08* | (2006.01) |
| *G02B 21/26* | (2006.01) |
| *G02B 21/36* | (2006.01) |
| *G02B 7/09* | (2006.01) |
| *G02B 7/14* | (2006.01) |
| *G02B 7/16* | (2006.01) |

(52) U.S. Cl.
CPC ................ *G02B 21/06* (2013.01); *G02B 21/00* (2013.01); *G02B 21/0004* (2013.01); *G02B 21/0088* (2013.01); *G02B 21/365* (2013.01); *G02B 7/09* (2013.01); *G02B 7/14* (2013.01); *G02B 7/16* (2013.01); *G02B 21/0016* (2013.01); *G02B 21/0032* (2013.01); *G02B 21/08* (2013.01); *G02B 21/082* (2013.01); *G02B 21/26* (2013.01); *G02B 21/362* (2013.01)

(58) Field of Classification Search
CPC .............. G02B 7/02; G02B 7/09; G02B 7/14; G02B 7/16; G02B 21/00; G02B 21/0004; G02B 21/0016; G02B 21/06; G02B 21/08; G02B 21/082; G02B 21/362; G02B 21/365; G02B 21/0032; G02B 21/24; G02B 21/26; G02B 21/34
USPC ......... 359/368, 379–394, 396, 398, 821, 827; 362/575; 348/79, E7.085
See application file for complete search history.

(56) References Cited

U.S. PATENT DOCUMENTS

| | | |
|---|---|---|
| 3,905,315 A | 9/1975 | Sasaki |
| 5,523,083 A | 6/1996 | Shasha et al. |

(Continued)

FOREIGN PATENT DOCUMENTS

| | | |
|---|---|---|
| JP | 51029149 A | 3/1976 |
| WO | 9618924 A1 | 6/1996 |
| WO | WO 96/18294 A1 | 6/1996 |

*Primary Examiner* — Loha Ben

(74) *Attorney, Agent, or Firm* — Holtz, Holtz, Goodman & Chick PC

(57) ABSTRACT

A microscope includes: a light source configured to generate light for irradiating a specimen; a microscope main body which supports the light source and on which an accommodation unit that accommodates the specimen is placed; a plurality of optical units, each of which is detachably installed in the microscope main body, configured to arranged on an optical path of the light, and configured to change optical characteristics of the light incident thereon; an operation input unit that includes a plurality of input units configured to respectively receive inputs of drive signals for driving optical units to be controlled among the plurality of optical units; and a control unit configured to allocate optical units to be respectively driven with the drive signals by the plurality of input units according to the plurality of optical units installed in the microscope main body.

5 Claims, 12 Drawing Sheets

(56) References Cited

U.S. PATENT DOCUMENTS

| | | | |
|---|---|---|---|
| 6,885,492 B2 * | 4/2005 | DeSimone et al. | 359/290 |
| 7,224,522 B2 * | 5/2007 | Kawanabe et al. | 359/381 |
| 7,397,602 B2 * | 7/2008 | Endo | 359/388 |
| 7,778,485 B2 * | 8/2010 | Zeineh et al. | 382/284 |
| 8,699,131 B2 * | 4/2014 | Shirota et al. | 359/381 |
| 8,867,126 B2 * | 10/2014 | Shirota et al. | 359/392 |
| 8,957,957 B2 * | 2/2015 | Matsuo | 348/79 |
| 8,982,454 B2 * | 3/2015 | Yamamoto et al. | 359/370 |

* cited by examiner

FIG.5

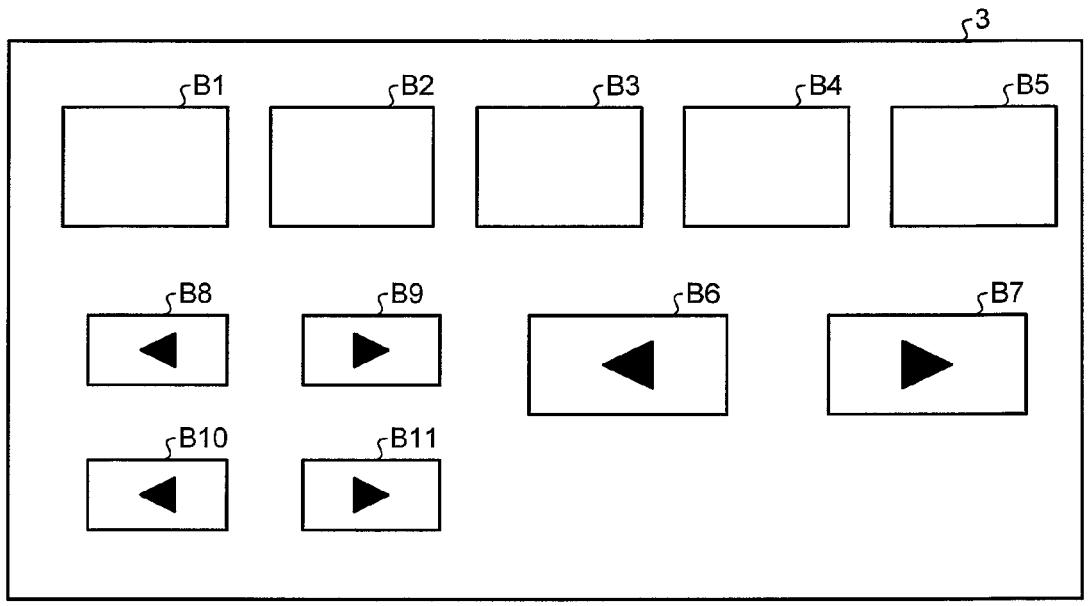

FIG.6

| | BF MICRO-SCOPY | 20 TIMES RC MICROSCOPY | 40 TIMES RC MICROSCOPY | 20 TIMES PO MICROSCOPY | 60 TIME S DIC MICROSCOPY |
|---|---|---|---|---|---|
| POLARIZER | PARALLEL NICOLS WITH ANALYZER | ROTATION TO ARBITRARY ANGLE | ROTATION TO ARBITRARY ANGLE | CROSSED NICOLS WITH ANALYZER | CROSSED NICOLS WITH ANALYZER |
| COMPEN-SATOR | PARALLEL NICOLS WITH POLARIZER | PARALLEL NICOLS WITH POLARIZING PLATE IN RC ELEMENT | PARALLEL NICOLS WITH POLARIZING PLATE IN RC ELEMENT | ROTATION TO ARBITRARY ANGLE IN OPTICAL PATH | PARALLEL NICOLS WITH POLARIZER |
| CONDENSER TURRET | EMPTY OPENING | APERTURE FOR 20 TIMES RC | APERTURE FOR 40 TIMES RC | EMPTY OPENING | 60 TIMES DIC PRISM |
| OBJECTIVE LENS | 4 TIMES | FOR 20 TIMES RC | FOR 40 TIMES RC | FOR 20 TIMES RC | 60 TIMES |
| DIC PRISM (OBJECTIVE LENS SIDE) | OUTSIDE OPTICAL PATH | OUTSIDE OPTICAL PATH | OUTSIDE OPTICAL PATH | OUTSIDE OPTICAL PATH | INSIDE OPTICAL PATH |
| ANALYZER | INSIDE OPTICAL PATH (FIXED) | INSIDE OPTICAL PATH (FIXED) | INSIDE OPTICAL PATH (FIXED) | INSIDE OPTICAL PATH (FIXED) | INSIDE OPTICAL PATH (FIXED) |

| | SYSTEM CONFIGURATION | | | | BUTTON ALLOCATION |
|---|---|---|---|---|---|
| A | CONDENSER UNIT | FILTER WHEEL | REVOLVER | DIC PRISM | 1 |
| B | CONDENSER UNIT | FILTER WHEEL | REVOLVER | FLUORESCENT MIRROR UNIT | 2 |
| C | CONDENSER UNIT | DIC PRISM | REVOLVER | FLUORESCENT MIRROR UNIT | 3 |
| ⋮ | ⋮ | | | | ⋮ |

T2

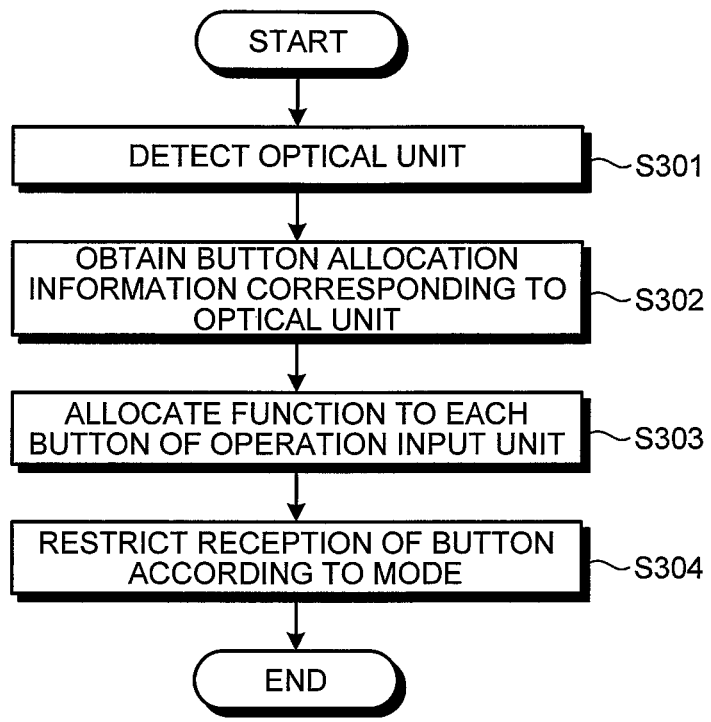

MICROSCOPE

CROSS-REFERENCE TO RELATED APPLICATIONS

This application is based upon and claims the benefit of priority from Japanese Patent Application No. 2013-072332, filed on Mar. 29, 2013, the entire contents of which are incorporated herein by reference.

BACKGROUND

1. Technical Field

The disclosure relates to microscope technology for observing a specimen placed on a stage, and particularly to a microscope suitable for micro insemination.

2. Related Art

In recent years, micro insemination in the field of advanced reproductive medicine has been known as one use of microscopes. Micro insemination is a method of fertilizing an egg with a sperm under a microscope and is generally performed by an intracytoplasmic sperm injection (hereinafter, referred to as "ICSI") method of piercing the egg fixed by a holding pipette with a sperm-containing micropipette to inject the sperm into the egg. In this ICSI, since a specimen is manipulated on a stage, an inverted microscope having a large working space above the stage is generally used.

Further, in the field of micro insemination, in order to improve egg fertilization rates, relief contrast microscopy (hereinafter, referred to as "RC microscopy") that allows stereoscopic observation of egg, differential interference contrast microscopy (hereinafter, referred to as "DIC microscopy") that is suitable for observation of sperms, and polarized light microscopy (hereafter, referred to as "PO microscopy") that allows observation of spindles of egg are known (see, for example, Japanese Laid-open Patent Publication No. 51-29149).

Further, recently, a microscope, which is configured of a plurality of electrically driven units including an electrically driven focusing unit, an electrically driven optical element changeover unit, and the like, is known as such a microscope (see, for example, International Patent Publication No. WO 1996/18924). In this technique, functions of receiving inputs of instruction signals for driving the electrically driven units are respectively allocated to a plurality of buttons provided in an operating unit.

SUMMARY

In some embodiments, a microscope includes: a light source configured to generate light for irradiating a specimen; a microscope main body which supports the light source and on which an accommodation unit that accommodates the specimen is placed; a plurality of optical units, each of which is detachably installed in the microscope main body, configured to be arranged on an optical path of the light, and configured to change optical characteristics of the light incident thereon; an operation input unit that includes a plurality of input units configured to respectively receive inputs of drive signals for driving optical units to be controlled among the plurality of optical units; and a control unit configured to allocate optical units to be respectively driven with the drive signals by the plurality of input units according to the plurality of optical units installed in the microscope main body.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating a configuration of an operation input unit of the microscope according to the first embodiment of the present invention;

FIG. 6 is a diagram illustrating set information recorded by a setting information recording unit of the microscope according to the first embodiment of the present invention;

FIG. 16 is a flow chart illustrating an outline of a process executed by the microscope according to the fourth embodiment of the present invention.

DETAILED DESCRIPTION

Hereinafter, with reference to the drawings, modes for carrying out the present invention (hereinafter, referred to as "embodiments") will be described. The present invention is not limited by embodiments described below. Further, in describing the drawings, the same portions are appended with the same reference signs.

First Embodiment

Figure 1:
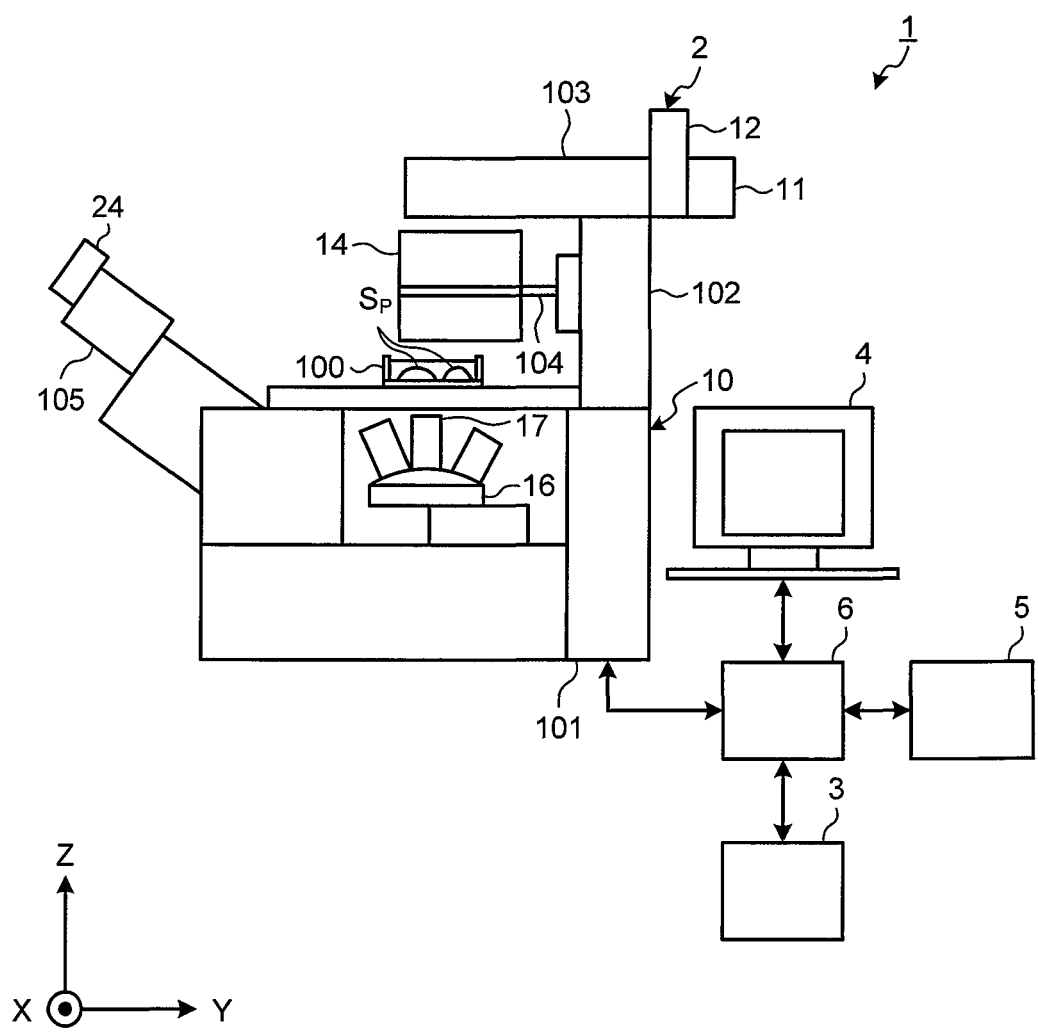
FIG. 1 is a conceptual diagram illustrating a schematic configuration of a microscope according to a first embodiment of the present invention.
Figure 2:
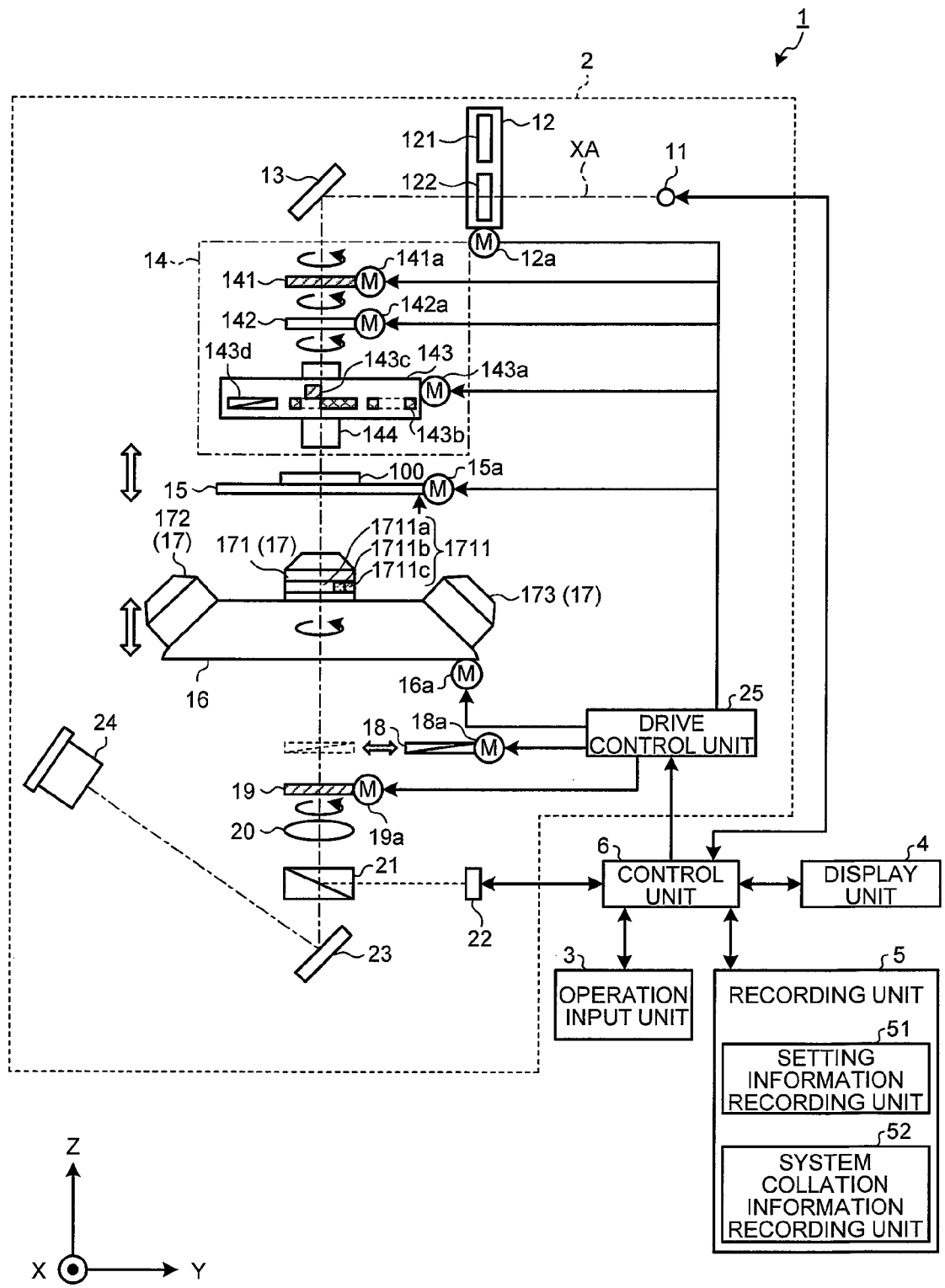
FIG. 2 is a block diagram illustrating a configuration of the microscope according to the first embodiment of the present invention.

FIG. 1 is a conceptual diagram illustrating a schematic configuration of a microscope according to a first embodiment of the present invention. FIG. 2 is a block diagram illustrating a configuration of the microscope according to the first embodiment of the present invention. In describing FIG.

1 and FIG. 2, a plane on which a microscope 1 is placed is referred to as an XY-plane and a direction perpendicular to the XY-plane is referred to as a Z-direction.

The microscope 1 illustrated in FIG. 1 and FIG. 2 includes: a microscope main body unit 2 for observing a petri dish 100 in which a specimen Sp is accommodated; an operation input unit 3 that receives inputs of various operations of the microscope 1; a display unit 4 that displays an image corresponding to image data captured by the microscope main body unit 2; a recording unit 5 that records therein various programs, parameters, and the like for driving the microscope 1; a control unit 6 that controls the microscope main body unit 2, the operation input unit 3, and the display unit 4. The microscope main body unit 2, the operation input unit 3, the display unit 4, the recording unit 5, and the control unit 6 are wiredly or wirelessly connected to one another to be able to transmit and receive various signals (for example, control signals, image signals, and the like).

First, the microscope main body unit 2 is described in detail. The microscope main body unit 2 includes a microscope main body 10, a light source 11, a filter wheel 12, a first mirror 13, a condenser unit 14, a stage 15, a revolver 16, an objective lens 17, a DIC prism 18, an analyzer 19, a tube lens 20, an optical path splitting prism 21, an imaging unit 22, a second mirror 23, an eyepiece 24, and a drive control unit 25. In the first embodiment, the filter wheel 12, the condenser unit 14, the revolver 16, the objective lens 17, the DIC prism 18, and the analyzer 19 function as optical units.

The microscope main body 10 includes: a casing 101 that supports the light source 11 and on which the petri dish 100 (accommodation unit) that accommodates the specimen Sp is placed via the stage 15; an illumination support unit 102 that is attached to the casing 101 and extends upward; a first arm unit 103 that extends, from an upper end of the illumination support unit 102, in a direction orthogonal to a direction in which the illumination support unit 102 extends and that holds the light source 11 and the filter wheel 12; a second arm unit 104 that extends, from between the first arm unit 103 and the casing 101, in a direction orthogonal to the direction in which the illumination support unit 102 extends and that holds the condenser unit 14; and a lens barrel 105 that is provided on a front surface (left side surface in FIG. 1) that is a lateral side, which is one of lateral sides of the casing 101, the lateral side on which the eyepiece 24 is provided and which faces a user of the microscope main body unit 2.

The light source 11 generates, under control of the control unit 6, light to be irradiated on the specimen Sp. The light source 11 is configured of a halogen lamp, a xenon lamp, a light emitting diode (LED), or the like.

The filter wheel 12 dims illumination light irradiated by the light source 11. The filter wheel 12 has a first filter 121 and a second filter 122 that transmit wavelength bands different from each other. The filter wheel 12 arranges, under drive control of the drive control unit 25, the first filter 121 or the second filter 122 on an optical path by a motor 12a configured of a stepping motor, a DC motor, or the like.

The first mirror 13 reflects the illumination light irradiated from the light source 11 towards the condenser unit 14. A plurality of relay lenses may be provided on the optical path of the first mirror 13 and filter wheel 12.

The condenser unit 14 is detachably attached to the second arm unit 104 of the microscope main body 10. The condenser unit 14 includes a plurality of optical units that are insertable to and removable from the optical path of the light emitted from the light source 11 or rotatable about an optical axis XA of the condenser unit 14. Specifically, the condenser unit 14 includes a polarizer 141, a compensator 142, a condenser turret 143, and a condenser lens 144. In the condenser unit 14, the polarizer 141, the compensator 142, the condenser turret 143, and the condenser lens 144 are provided in this order from a light source 11 side.

The polarizer 141 is arranged on the optical path and transmits only a polarized component of one direction of the illumination light irradiated by the light source 11. The polarizer 141 is rotatably arranged about the optical axis XA of the condenser unit 14. The polarizer 141 is configured by using a polarizing plate, which is one of optical elements like a filter. Further, the polarizer 141 is rotated, under the drive control of the drive control unit 25, about the optical axis XA of the optical path, by a motor 141a configured of a stepping motor, a DC motor, or the like.

The compensator 142 is an optical element for measuring a phase difference due to anisotropy of the specimen Sp, and has a configuration to vary retardation of the specimen Sp. The compensator 142 is arranged rotatably about the optical axis XA of the condenser unit 14. Further, the compensator 142 is rotated, under the drive control of the drive control unit 25, about the optical axis XA of the optical path, by a motor 142a configured of a stepping motor, a DC motor, or the like.

The compensator 142 is configured by using a liquid crystal or a wavelength plate. Specifically, the compensator 142 is configured by using a Berek compensator, a Senarmont compensator, a Bräce-köhler compensator, a quartz wedge compensator, or a liquid crystal modulation element. Since field retardation upon PO microscopy for observing spindles of egg is desirably substantially uniform, the compensator 142 is preferably a liquid crystal modulation element, a Senarmont compensator, or a Bräce-köhler compensator. If a liquid crystal modulation element is used as the compensator 142, by electrically controlling liquid crystal molecules, the retardation is variable.

Further, if a Senarmont compensator is used as the compensator 142, by rotation of the polarizer 141 with respect to a wavelength plate in the compensator 142, the retardation of the compensator 142 is variable. Further, if a Bräce-köhler compensator is used as the compensator 142, by rotation of a prism in the compensator 142, the retardation of the compensator 142 is variable.

The condenser turret 143 includes a plurality of optical elements that are changed over for use according to an observation method and a magnification of the objective lens 17, and is rotatably arranged on the optical path. The condenser turret 143 arranges any of the optical elements on the optical path by being rotated according to a microscopy. Further, the condenser turret 143 is rotated, under the drive control of the drive control unit 25, by a motor 143a configured of a stepping motor, a DC motor, or the like. The condenser turret 143 includes an aperture 143b, an RC microscopy aperture plate 143c, and a DIC prism.

The aperture 143b is arranged on the optical path by the rotation of the condenser turret 143. The aperture 143b forms, together with the condenser turret 143, an aperture plate (empty opening). The aperture 143b is formed in a size sufficient to not shield the illumination light from the light source 11 and realizes illumination of a high numerical aperture. The aperture 143b is used, for example, when the microscope 1 performs bright field microscopy (hereinafter, referred to as "BF microscopy") or PO microscopy. Specifically, if the microscope 1 performs BF microscopy, the aperture 143b is used when the user prepares for micro insemination by looking for a location in the petri dish 100 using the objective lens 17 of 4 times or 10 times or by performing positioning or the like of a needle tip of a micropipette manipulated by a manipulator.

The RC microscopy aperture plate 143c is arranged on the optical path by the rotation of the condenser turret 143. The RC microscopy aperture plate 143c is an aperture plate used for RC microscopy and has a polarizing plate (not illustrated) in a part of an aperture formed at a position eccentric from the optical path when arranged on the optical path. The aperture realizes biased emission illumination by being formed at a position shifted from a center of the RC microscopy aperture plate 143c. The polarizing plate transmits only a polarized component of one direction of light that has transmitted through the polarizer 141. The RC microscopy aperture plate 143c configured as described above is used when the microscope 1 performs RC microscopy of 20 times.

A DIC prism 143d is arranged on the optical path by the rotation of the condenser turret 143. The DIC prism 143d pairs with the later described DIC prism 18 arranged at an image side of an objective lens 17 side to form a differential interference optical system. The DIC prism 143d is configured by using a Nomarski prism or the like. The DIC prism 143d is used, for example, when the microscope 1 performs DIC microscopy of 60 times.

In the condenser turret 143 configured as described above, the optical element arranged on the optical path is changed over by the condenser turret 143 being rotated by the motor 143a, according to the microscopy. Specifically, in the condenser turret 143, the RC microscopy aperture plate 143c is arranged on the optical path when RC microscopy is performed, the DIC prism 143d is arranged on the optical path when DIC microscopy is performed, and the aperture 143b is arranged on the optical path when BF microscopy or PO microscopy is performed.

The condenser lens 144 condenses the illumination light emitted from the light source 11 and performs uniform irradiation to a region including the specimen Sp in the petri dish 100. The condenser lens 144 may have, provided therein, a field stop that is able to adjust a quantity of illumination light emitted from the light source 11 and a field stop operating unit that changes a diameter of the field stop.

The stage 15 is configured to be movable in XYZ-directions. The stage 15 moves, under the drive control of the drive control unit 25, within the XY-plane or in YZ-directions by a motor 15a configured of a stepping motor, a DC motor, or the like. On the stage 15, the petri dish 100, on which the specimen Sp is arranged, is placed. On the stage 15, a heating unit that keeps the petri dish 100 at a constant temperature may be provided.

Figure 3:
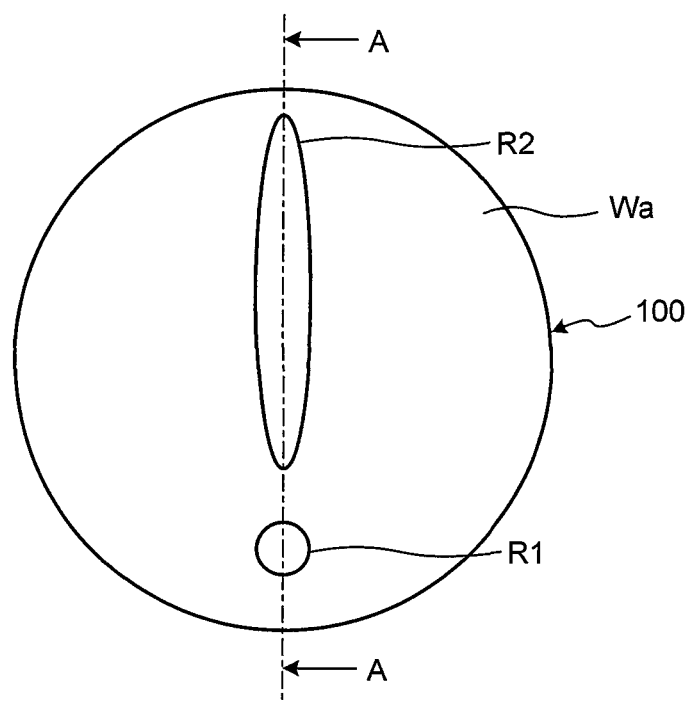
FIG. 3 is a plane view of a petri dish including a specimen.
Figure 4:
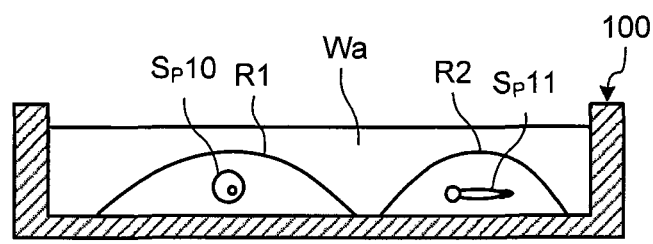
FIG. 4 is a cross section diagram along line A-A of FIG. 3.

The petri dish 100, on which the specimen Sp is arranged, is described in detail. FIG. 3 is a plane view of the petri dish 100 including the specimen Sp. FIG. 4 is a cross section diagram along line A-A of FIG. 3.

As illustrated in FIG. 3 and FIG. 4, in the petri dish 100 used in micro insemination, an ICSI drop R1 (culture) for fertilizing an egg Sp10 with a sperm Sp11 and a sperm sorting drop R2 (culture) for sorting the sperm Sp11 are formed, and covering is done with a mineral oil Wa that prevents each drop from contacting the air and being infected by bacteria. The number of drops in the petri dish 100 may be changed as appropriate.

In the revolver 16, a plurality of objective lenses 17 are installed. The revolver is provided rotatably with respect to the optical path and arranges the objective lenses 17 below the specimen Sp. The revolver 16 is configured by using a swing revolver or the like. The revolver 16 is rotated, under the drive control of the drive control unit 25, by a motor 16a configured of a stepping motor, a DC motor, or the like. Further, the revolver 16 is provided movably along an optical path direction and is moved, under the drive control of the drive control unit 25, in a vertical direction of the Z-direction by the motor 16a. A focusing mechanism to be moved in the optical path direction with respect to the revolver 16 may be provided separately.

The objective lens 17 is arranged at a position on the optical path, the position facing the condenser lens 144 and interposing the specimen Sp therebetween. The objective lens 17 includes an objective lens 171, an objective lens 172, and an objective lens 173.

The objective lens 171 is an objective lens that has a magnification suitable for observation of egg, for example, a magnification of 20 times, 40 times, or the like, and that is used in RC microscopy. The objective lens 171 has a modulator 1711 having three regions of different transmissivities at a pupil position of the objective lens 171. The modulator 1711 includes a region 1711a having the transmissivity of 100%, a region 1711b having the transmissivity of about 25%, and a region 1711c having the transmissivity of 0%. The modulator 1711 has an optically conjugate relation with the RC microscopy aperture plate 143c arranged at a pupil position of the condenser lens 144. The objective lens 171 is applied to PO microscopy that has a whole image of an egg as a target to be observed and that requires a magnification of about the same.

The objective lens 172 is an objective lens that has a magnification suitable for observation of sperms, for example, a high magnification of 60 times, 100 times, or the like, and the objective lens 172 is used in DIC microscopy.

The objective lens 173 is an objective lens that has a magnification suitable for observation of needle tips of micropipettes, for example, a low magnification of 4 times, and the objective lens 173 is used in BF microscopy.

The DIC prism 18 pairs with the DIC prism 143d to forms a differential interference optical system. The DIC prism 18 is configured by using a Nomarski prism or the like. The DIC prism 18 is insertably and removably arranged with respect to the optical path between the objective lens 17 and the analyzer 19. Further, the DIC prism 18 is arranged, under the drive control of the drive control unit 25, on the optical path by a motor 18a configured of a stepping motor, a DC motor, or the like.

The analyzer 19 is arranged rotatably about the optical axis XA at an observation side at a stage later than the objective lens 17, and transmits, according to a relative positional relation with the polarizer 141, only a polarized component in one direction of light that has passed the specimen Sp. Further, when the microscope 1 is to perform PO, microscopy and DIC microscopy, the polarizer 141 and the analyzer 19 are arranged in a crossed Nicols state where polarization directions thereof are orthogonal to each other. Further, the analyzer 19 is rotated, under the drive control of the drive control unit 25, about the optical axis XA of the optical path by a motor 19a configured of a stepping motor, a DC motor, or the like. The analyzer 19 may be insertable and removable with respect to the optical path.

The tube lens 20 condenses light emitted from the objective lens 17 and forms an image of an observation image. The tube lens 20 is configured by using one lens or a plurality of lenses.

The optical path splitting prism 21 divides light of the observation image formed by the tube lens 20 into the imaging unit 22 and the second mirror 23. The optical path splitting prism 21 is configured by using a prism having a joint surface that has been subjected to coating for dividing light.

The imaging unit 22 images an observation image of the specimen Sp incident via the tube lens 20 and the optical path splitting prism 21 to generate image data, and outputs this image data to the control unit 6. The imaging unit 22 is configured by using an imaging element, such as a charge coupled device (CCD) or a complementary metal oxide semiconductor (CMOS).

The second mirror 23 reflects the observation image emitted from the tube lens 20 towards the eyepiece 24. A plurality of relay lenses may be provided on the optical path of the second mirror 23 and eyepiece 24.

The eyepiece 24 magnifies the observation image incident via the tube lens 20, the optical path splitting prism 21, and the second mirror 23. The eyepiece 24 is configured by using one lens or a plurality of lenses.

The drive control unit 25 is configured by using a driver, a central processing unit, and the like, and under the control of the control unit 6, moves or rotates each optical unit of the microscope main body unit 2. Specifically, the drive control unit 25 rotates or moves, under the control of the control unit 6, the filter wheel 12, the polarizer 141, the compensator 142, the condenser turret 143, the stage 15, the revolver 16, the DIC prism 18, and the analyzer 19 to specified positions, by driving the motor 12a, the motor 141a, the motor 142a, the motor 143a, the motor 15a, the motor 16a, the motor 18a, and the motor 19a, respectively.

The operation input unit 3 receives input of various operations of the microscope 1. The operation input unit 3 includes a plurality of input units that respectively receive inputs of drive signals that drive the optical units to be controlled, of the plurality of optical units. The operation input unit 3 is configured by using a key board, a mouse, a joy stick, a touch panel, a rotary switch, a pull button, and the like, and outputs, to the control unit 6, instruction signals corresponding to operations of various switches.

FIG. 5 is a diagram illustrating a configuration of the operation input unit 3. The operation input unit 3 illustrated in FIG. 5 includes buttons B1 to B11, which are input units for the instruction signals that instruct the respective microscopies and input units that receive the drive signals for driving the optical units. Under the control of the control unit 6, inputs of the instruction signals for instructing the respective microscopies and the inputs of the drive signals for driving the optical units are allocated to the buttons B1 to B11, according to the condenser unit 14 installed in the microscope main body 10. Specifically, the instruction signals for instructing the respective microscopies, for example, BF microscopy, 20 times RC microscopy, 40 times RC microscopy, 20 times PO microscopy, and 60 times DIC microscopy are respectively allocated, under the control of the control unit 6, to the buttons B1 to B5 serving as microscopy input units. Further, instruction signals for adjusting contrasts are allocated to the buttons B6 and B7. Further, the drive signals for changing the magnification of the objective lens 17 are allocated to the button B8 and button B9. Furthermore, the drive signals for driving the filter wheel 12 are allocated to the button B10 and button B11. The control unit 6 may automatically perform the allocation of the respective buttons (buttons B1 to B11) according to the system configuration of the microscope 1.

The display unit 4 displays an image corresponding to the image data input from the imaging unit 22 via the control unit 6. The display unit 4 is configured by using a display panel made of a liquid crystal, organic electro-luminescence (EL), or the like.

The recording unit 5 records therein various programs to be executed by the microscope 1 and various data to be used during the execution of the programs. The recording unit 5 is configured by using semiconductor memories such as a flash memory and a random access memory (RAM). Further, the recording unit 5 includes a setting information recording unit 51 that records therein setting information associating positional information of each optical unit on the optical path with each microscopy, and a system collation information recording unit 52 that records therein system collation information allocating to the buttons B1 to B11 of the operation input unit 3 according to types of the condenser unit 14 installed in the microscope main body unit 2 or the optical units provided in the microscope main body unit 2.

FIG. 6 is a diagram illustrating the setting information recorded by the setting information recording unit 51. As illustrated in FIG. 6, in setting information T1, positional information of each optical unit corresponding to each microscopy is recorded. For example, as illustrated in FIG. 6, when bright field microscopy is performed, the polarizer 141 is arranged to be in a parallel Nicols state with respect to the analyzer 19, the compensator 142 is arranged in a parallel Nicols state with respect to the polarizer 141, the aperture 143b of the condenser turret 143 is arranged on the optical path, the objective lens is of 4 times, the DIC prism 18 is arranged outside the optical path, and the analyzer 19 is arranged on the optical path.

Figures 7, 8:
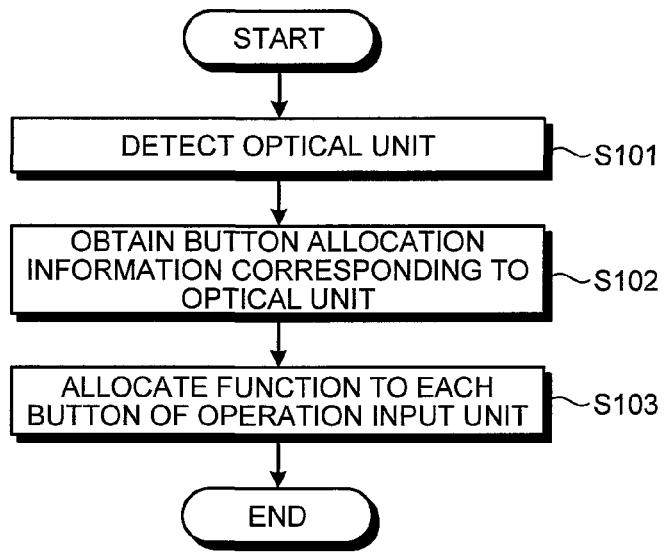
FIG. 7 is a diagram illustrating system collation information recorded by a system collation information recording unit of the microscope according to the first embodiment of the present invention.
FIG. 8 is a flow chart illustrating an outline of a process executed by the microscope according to the first embodiment of the present invention.

FIG. 7 is a diagram illustrating the system collation information recorded in the system collation information recording unit 52. As illustrated in FIG. 7, in system collation information T2, the system configuration and allocation information of the functions of the buttons B1 to B11 of the operation input unit 3 are recorded in association with each other. For example, for system configuration "A", a button allocation of "1" is recorded in association therewith.

The control unit 6 is configured by using a CPU or the like, and comprehensively controls operations of each unit forming the microscope 1. The control unit 6 sets the functions allocated to the buttons B1 to B11 of the operation input unit 3 according to the condenser unit 14 installed in the microscope main body 10. For example, if the type of the condenser unit 14 installed in the microscope main body 10 is for ICSI, the control unit 6 allocates the functions of receiving the inputs of the instruction signals for instructing the respective microscopies to the buttons B1 to B4. Further, the control unit 6 moves, under the drive control of the drive control unit 25, each optical unit forming the microscope 1 by driving each motor, according to an operation signal input from the operation input unit 3. Specifically, the control unit 6 changes the microscopy by referring to the setting information T1 recorded in the setting information recording unit 51 and causing the drive control unit 25 to move the plurality of optical units to the positions on the optical path depending on the microscopies. The control unit 6 may automatically perform the allocation of the respective buttons (buttons B1 to B11) according to the system configuration of the microscope 1.

The microscope 1 configured as described above is able to performs BF microscopy, RC microscopy, PO microscopy, and DIC microscopy, by changing respectively, under the control of the control unit 6, the positions and angles on the optical path and insertion to and removal from the optical path, of the filter wheel 12, the polarizer 141, the compensator 142, the condenser turret 143, the revolver 16, the DIC prism 18, and the analyzer 19.

Next, a process of the microscope 1 allocating the functions to the buttons B1 to B11 of the operation input unit 3 is described. FIG. 8 is a flow chart illustrating an outline of the process executed by the microscope 1.

As illustrated in FIG. 8, when power is supplied to the microscope 1, the control unit 6 detects the condenser unit 14 connected to the microscope main body unit 2 (Step S101), and obtains the button allocation information corresponding to the type of the connected condenser unit 14 from the system collation information recording unit 52 (Step S102).

Figure 9:
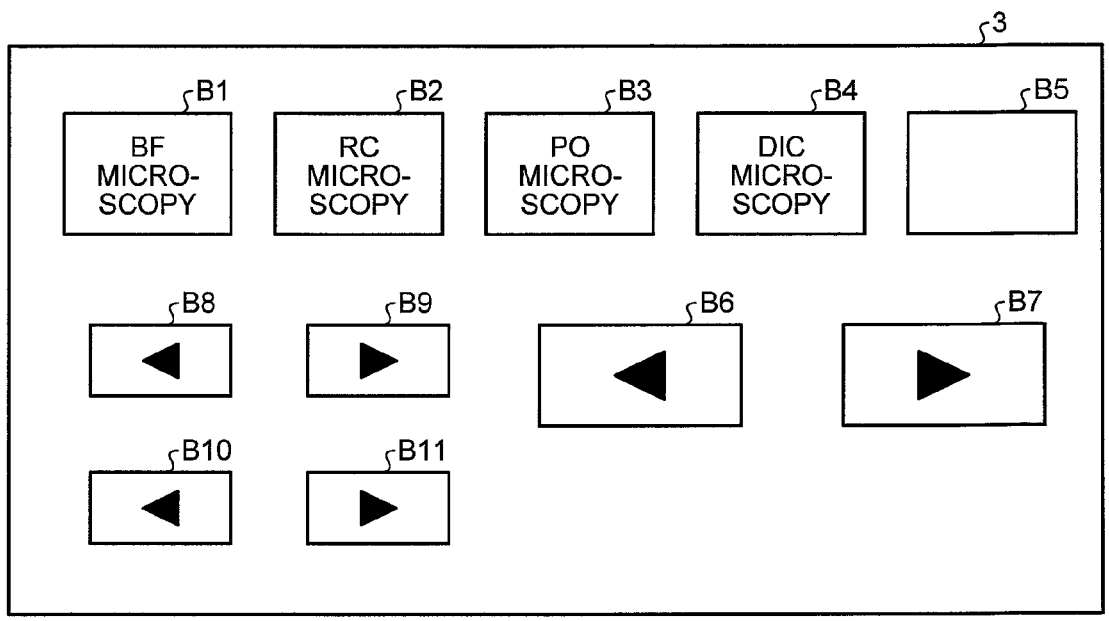
FIG. 9 is a diagram illustrating an example of allocation of each button in the operation input unit of the microscope according to the first embodiment of the present invention.

Subsequently, the control unit 6 allocates the function to each button of the operation input unit 3 (Step S103). For example, if the condenser unit 14 is for ICSI, as illustrated in FIG. 9, the control unit 6 allocates the instruction signals for instructing BF microscopy, RC microscopy, PO microscopy, and DIC microscopy respectively to the buttons B1 to B4. Further, the control unit 6 allocates the instruction signals for adjusting the contrasts to the buttons B6 and B7 respectively. Further, the control unit 6 allocates the drive signals for changing the magnification of the objective lens 17 to the button B8 and button B9, respectively. Furthermore, the control unit 6 allocates the drive signals for driving the filter wheel 12 to the button B10 and button B11. The control unit 6 does not allocate an instruction signal to the button B5.

Figure 10:
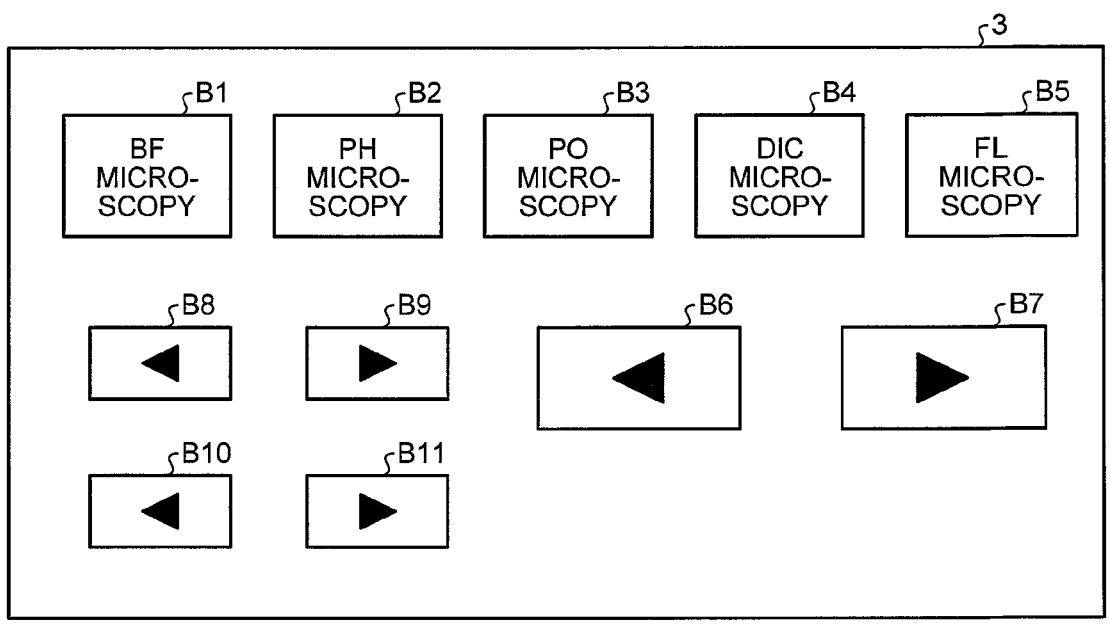
FIG. 10 is a diagram illustrating another example of the allocation of each button in the operation input unit of the microscope according to the first embodiment of the present invention.

Further, if the condenser unit 14 is for a general specimen microscopy, as illustrated in FIG. 10, instruction signals for instructing BF microscopy, phase difference microscopy (hereinafter, referred to as "PH microscopy"), PO microscopy, DIC microscopy, and fluorescence microscopy (hereinafter, referred to as "FL microscopy") are allocated to the buttons B1 to B5, respectively. Further, the control unit 6 allocates drive signals for changing fluorescence cubes to the buttons B6 and B7, respectively. Further, the control unit 6 allocates the drive signals for changing the magnification of the objective lens 17 to the button B8 and button B9, respectively. Furthermore, the control unit 6 allocates the drive signals for driving the filter wheel 12 to the button B10 and button B11. After step S103, the microscope 1 ends the process.

According to the above described first embodiment of the present invention, the control unit 6 allocates, according to the condenser unit 14, the drive signals for driving the optical units and the instruction signals for instructing the microscopies to the respective buttons of the operation input unit 3. Thereby, in the operation input unit 3, the function of each button of the operation input unit 3 is automatically changed over according to the optical units installed in the microscope main body 10. As a result, even if any optical units are added on, without increasing the operating unit, space is able to be saved, and the optical units corresponding to the microscopy are adjustable by a simple operation.

Further, according to the first embodiment of the present invention, even if any optical units are added on, the add-on is able to be dealt with only by the operation input unit 3, and thus cost thereof is able to be reduced.

According to the first embodiment of the present invention, the control unit 6 allocates, according to the condenser unit 14, the drive signals for driving the optical units and the instruction signals for instructing the microscopies to the respective buttons of the operation input unit 3, but automatic allocation of the drive signals and the instruction signals for instructing the microscopies to the respective buttons of the operation input unit 3 may be performed accordingly with the system configuration of the microscope 1. Thereby, by the operation input unit 3 only, application to various microscopes is possible.

Further, in the first embodiment of the present invention, the drive signals and the instruction signals for instructing the microscopies may be allocated to the respective buttons of the operation input unit 3, according to connection information (type information) of a particular optical unit that changes over a mode of the microscope 1, of the plurality of the optical units installed in the microscope main body 10. Thereby, by the operation input unit 3 only, application to various microscopes is possible.

Second Embodiment

Next, a second embodiment of the present invention will be described. A microscope according to this second embodiment has a configuration different from that of the microscope 1 according to the above described first embodiment and a process executed by the microscope according to this second embodiment is different. Therefore, hereinafter, the microscope according to this second embodiment is described, and thereafter, the process executed by the microscope according to the second embodiment is described. The same components as those of the microscope 1 according to the above described first embodiment will be described being appended with the same reference signs.

Figure 11:
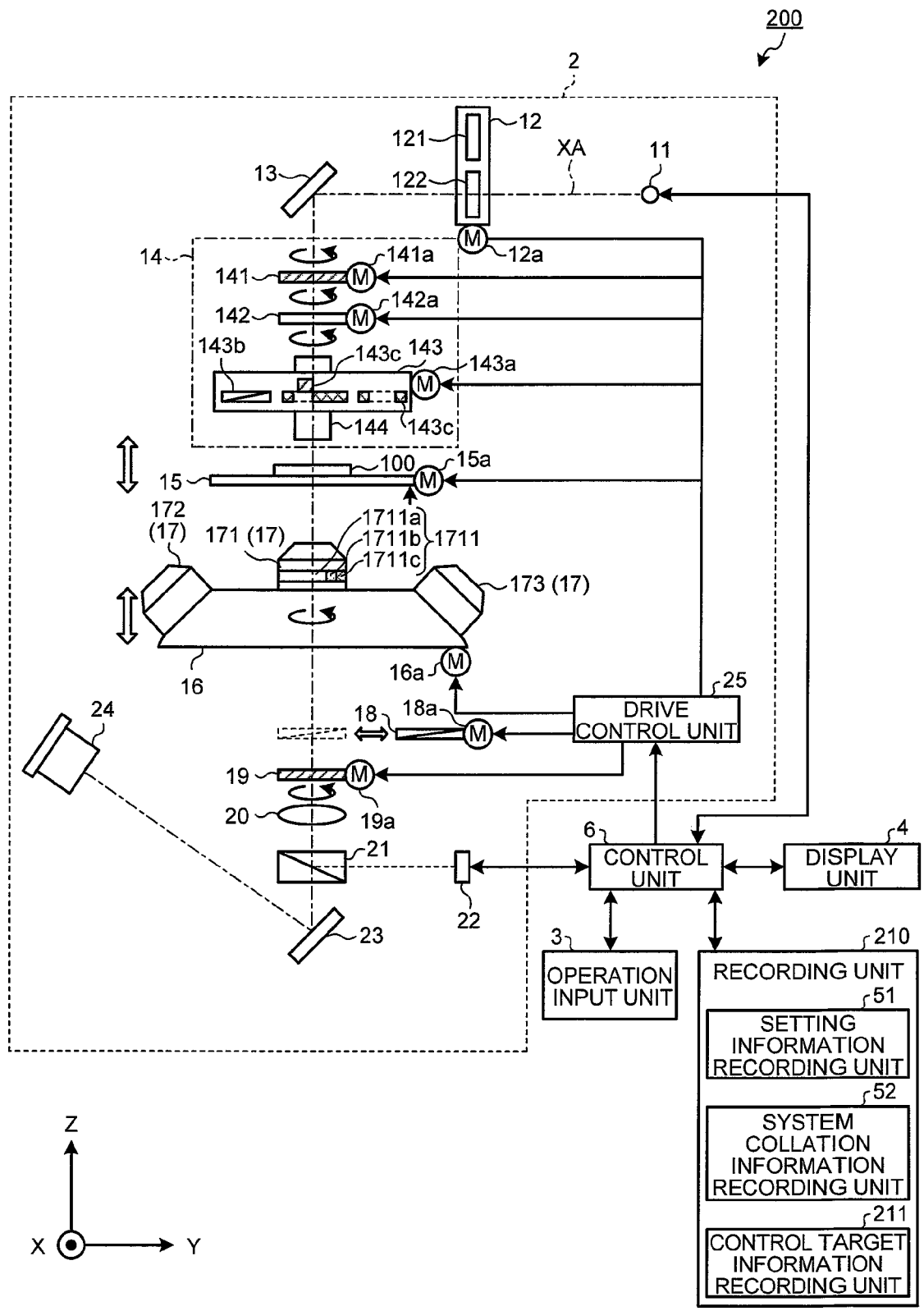
FIG. 11 is a block diagram illustrating a schematic configuration of a microscope according to a second embodiment of the present invention.

FIG. 11 is a block diagram illustrating a schematic configuration of the microscope according to the second embodiment of the present invention. A microscope 200 illustrated in FIG. 11 includes the microscope main body unit 2, the operation input unit 3, the display unit 4, the control unit 6, and a recording unit 210.

The recording unit 210 includes the setting information recording unit 51, the system collation information recording unit 52, and a control target information recording unit 211.

Figure 12:
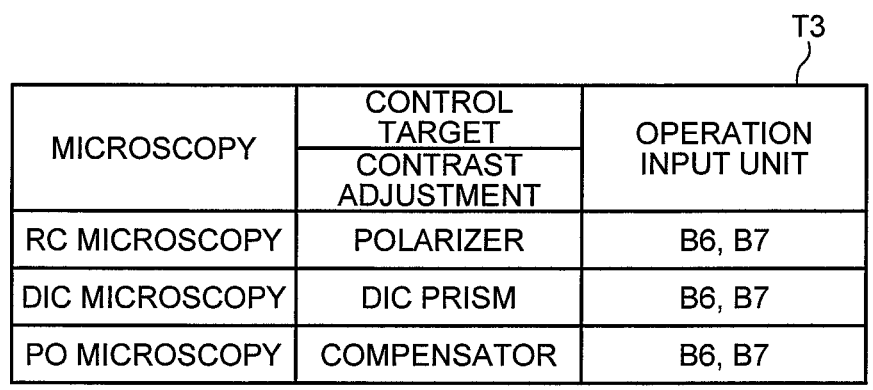
FIG. 12 is a diagram illustrating control target information recorded by a control target information recording unit of the microscope according to the second embodiment of the present invention.

The control target information recording unit 211 records therein control target information associating the optical unit to be controlled for each microscopy and the buttons of the operation input unit 3. FIG. 12 is a diagram illustrating the control target information recorded by the control target information recording unit 211. As illustrated in FIG. 12, in the control target information T3, the optical unit controlled for each microscopy and the buttons of the operation input unit 3 are recorded in association with each other. For example, for RC microscopy, the polarizer 141 is recorded as the control target, and the buttons B6 and B7 are recorded in association thereto as the buttons of the operation input unit 3.

Figure 13:
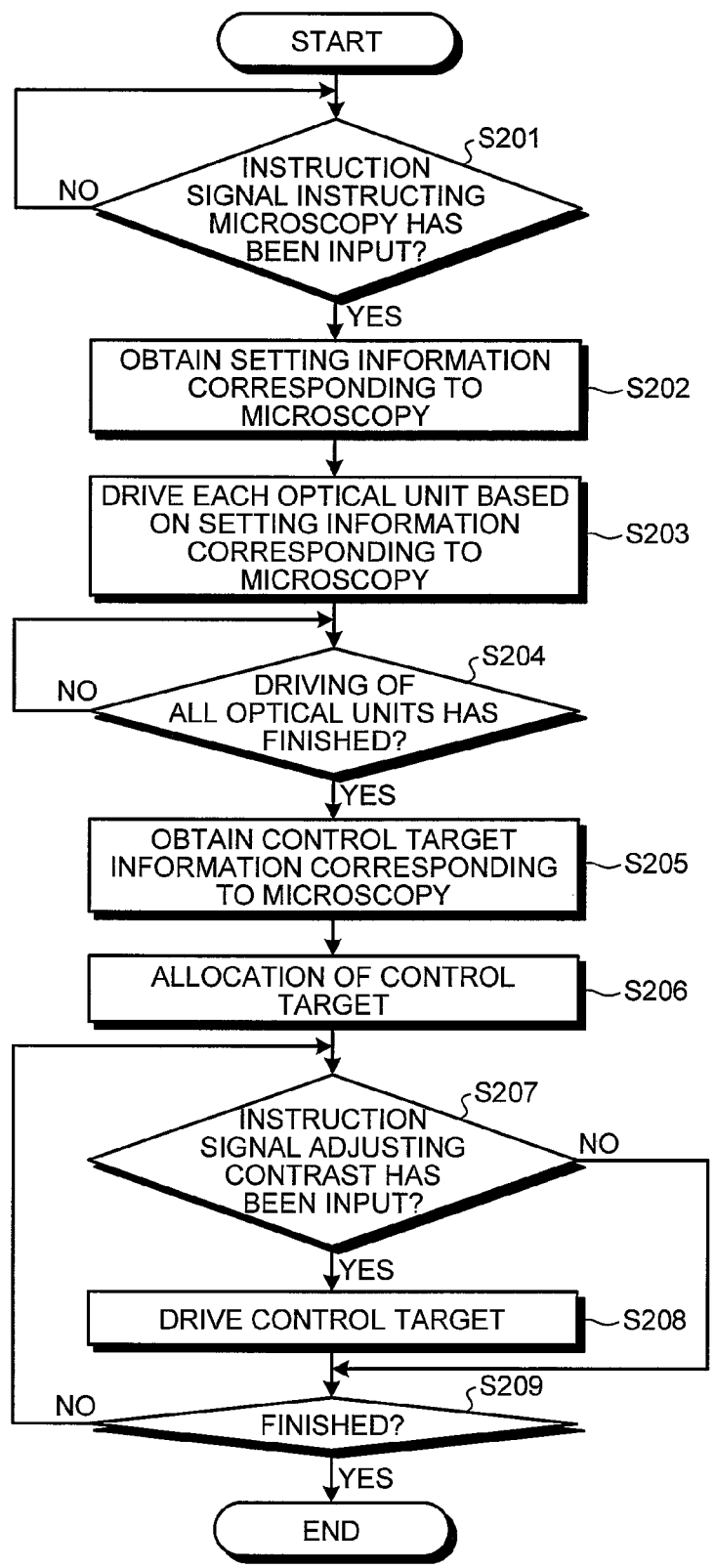
FIG. 13 is a flow chart illustrating an outline of a process executed by the microscope according to the second embodiment of the present invention.

A process executed by the microscope 200 configured as above is described. FIG. 13 is a flow chart illustrating an outline of the process executed by the microscope 200.

As illustrated in FIG. 13, the control unit 6 determines whether an instruction signal for instructing a microscopy has been input or not from the operation input unit 3 (step S201). Specifically, the control unit 6 determines whether or not the instruction signal for instructing the microscopy has been input or not via any of the buttons B1 to B5 of the operation input unit 3. If the control unit 6 determines that the instruction signal for instructing the microscopy has been input from the operation input unit 3 (step S201: Yes), the microscope 200 proceeds to step S202. On the contrary, if the control unit 6 determines that the instruction signal for instructing the microscopy has not been input from the operation input unit 3 (step S201: No), the control unit 6 waits until the instruction signal for instructing the microscopy is input from the operation input unit 3.

At step S202, the control unit 6 obtains, from the setting information recording unit 51, the setting information T1 corresponding to the microscopy of the instruction signal input from the operation input unit 3.

Subsequently, the control unit 6 drives each optical unit based on the setting information T1 obtained from the setting information recording unit 51 (step S203). Specifically, under the drive control of the drive control unit 25, the control unit 6 arranges, by driving each motor, the polarizer 141 and the analyzer 19 in a crossed Nicols state and the compensator 142 in a crossed Nicols state with respect to the analyzer 19, if the instruction signal for instructing DIC microscopy has been input from the operation input unit 3.

Thereafter, the control unit 6 determines whether driving of all of the optical units has finished or not (step S204). If the control unit 6 determines that the driving of all of the optical units has finished (step S204: Yes), the microscope 200 proceeds to step S205. On the contrary, if the control unit 6 determines that the driving of all of the optical units has not finished (step S204: No), the control unit 6 continues to make this determination.

At step S205, the control unit 6 obtains the control target information corresponding to the microscopy from the control target information recording unit 211.

Subsequently, the control unit 6 performs allocation of the optical unit to be controlled in accordance with the instruction signals input from the buttons of the operation input unit 3 (step S206). Specifically, if DIC microscopy is set as the microscopy of the microscope 200, the control unit 6 changes over the target to be controlled to the DIC prism according to the drive signals input from the button B6 and the button B7. Thereby, if the user manipulates the button B6 or B7, according to the drive signal input via the button B6 or button B7, under the drive control of the drive control unit 25, the control unit 6 drives the DIC prism 18 by driving the motor 18a.

Thereafter, if the instruction signal for adjusting the contrast has been input from the button B6 or B7 of the operation input unit 3 (step S207: Yes), the control unit 6 drives, under the drive control of the drive control unit 25, the optical unit to be controlled by driving each motor (step S208). For example, if the user has manipulated the button B6 or button B7, the control unit 6 slides, under the drive control of the drive control unit 25, the DIC prism 18 in a direction perpendicular to the optical axis XA by driving the motor 18a, in accordance with the drive signal input via the button B6 or button B7.

Subsequently, if the observation of the specimen Sp is to be finished (step S209: Yes), the microscope 200 ends the process. On the contrary, if the observation of the specimen Sp is not to be finished (step S209: No), the microscope 200 returns to step S207.

At step S207, if the drive signal to adjust the contrast has not been input from the button B6 or button B7 of the operation input unit 3 (step S207: No), the microscope 200 proceeds to step S209.

According to the above described second embodiment of the present invention, the control unit 6 changes over the allocation of the optical unit to be controlled by the buttons B6 and B7 for each microscopy. Thereby, a plurality of optical units can be performed by a single operation. As a result, by a simple operation, an optical unit corresponding to a microscopy is adjustable.

Third Embodiment

Next, a third embodiment of the present invention will be described. A microscope according to this third embodiment has a configuration different from that of the microscope 1 according to the above described first embodiment of the present invention. Therefore, hereinafter, a configuration of the microscope according to the third embodiment will be described. The same elements as those of the microscope 1 according to the above described first embodiment will be described being appended with the same reference signs.

Figure 14:
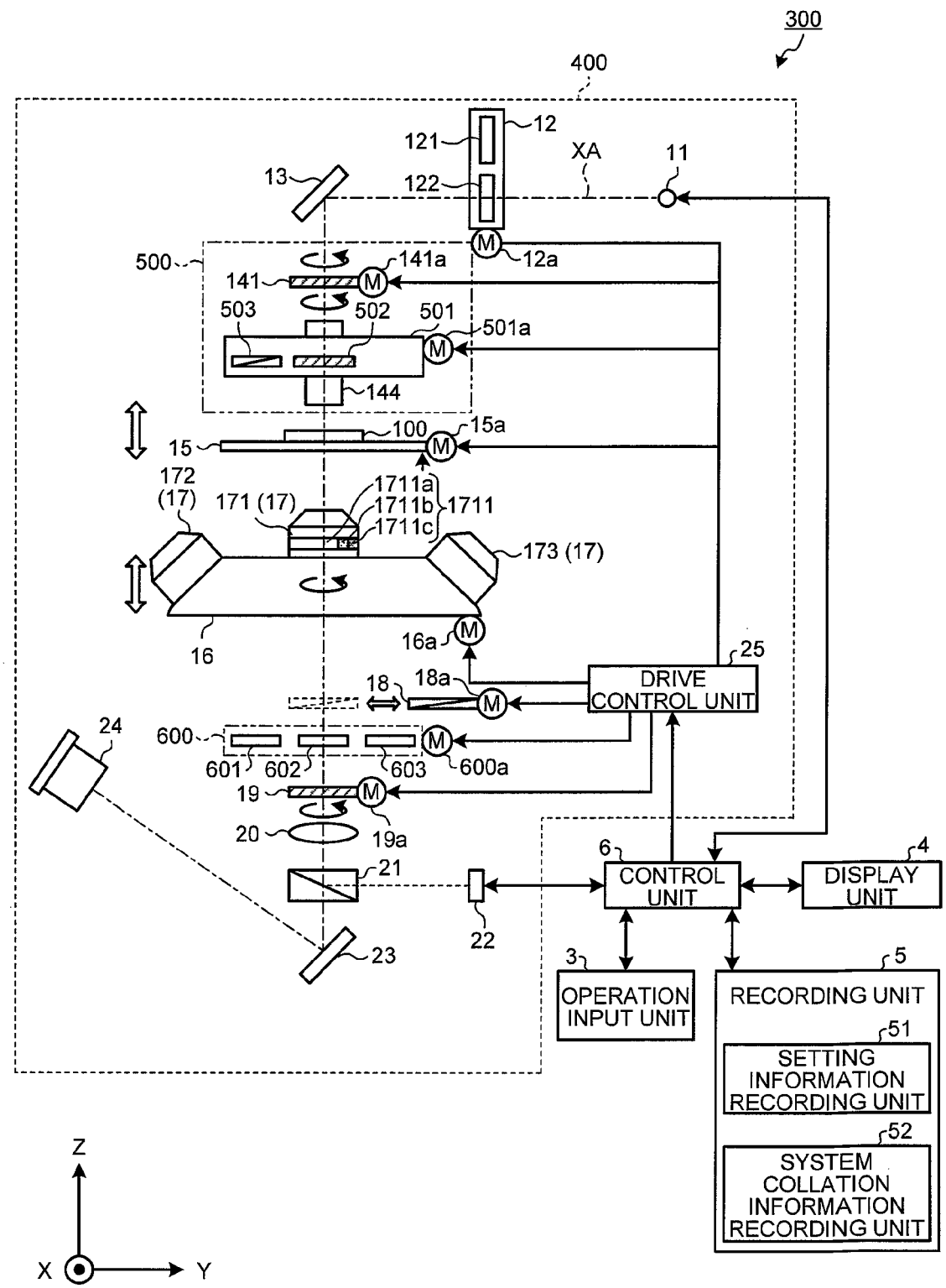
FIG. 14 is a block diagram illustrating a schematic configuration of a microscope according to a third embodiment of the present invention.

FIG. 14 is a block diagram illustrating a schematic configuration of the microscope according to the third embodiment of the present invention. A microscope 300 illustrated in FIG. 14 includes the operation input unit 3, the display unit 4, the recording unit 5, the control unit 6, and a microscope main body unit 400.

The microscope main body unit 400 includes the light source 11, the filter wheel 12, the first mirror 13, the stage 15, the revolver 16, the objective lens 17, the DIC prism 18, the analyzer 19, the tube lens 20, the optical path splitting prism 21, the imaging unit 22, the second mirror 23, the eyepiece 24, the drive control unit 25, a condenser unit 500, and an electrically driven fluorescent mirror unit 600.

The condenser unit 500 is detachably attached to the second arm unit 104 of the microscope main body 10. The condenser unit 500 includes the polarizer 141, the condenser lens 144, and a condenser turret 501.

The condenser turret 501 has a phase difference optical element 502 for PH microscopy and a DIC prism 503 for DIC microscopy. The condenser turret 501 is rotated, under the drive control of the drive control unit 25, by a motor 501a configured of a stepping motor, a DC motor, or the like.

The electrically driven fluorescent mirror unit 600 has a plurality of fluorescent cubes. Specifically, the electrically driven fluorescent mirror unit 600 has a first fluorescent cube 601, a second fluorescent cube 602, and a third fluorescent cube 603. The electrically driven fluorescent mirror unit 600 arranges any of the first fluorescent cube 601, the second fluorescent cube 602, and the third fluorescent cube 603 on the optical path by a motor 600a configured of a stepping motor or a DC motor.

The microscope 300 configured as described above changes over the drive signals of the control targets to be allocated to the buttons B6 to B11 of the operation input unit 3 according to the optical units, to which the control unit 6 is connected. For example, if the filter wheel 12 is connected to the control unit 6 via a communication cable and the drive control unit 25, as illustrated in the above described FIG. 10, the drive signals for driving the filter wheel 12 are allocated to the button B10 and button B11. If the DIC prism 18 is connected to the control unit 6 via a communication cable and the drive control unit 25, the control unit 6 allocates the drive signals for driving the DIC prism 18 to the button B10 and button B11. Further, the control unit 6 changes over the allocation of the instruction signals for instructing the microscopies to the respective buttons B1 to B5 of the operation input unit 3 according to the optical unit connected via the communication cable and the drive control unit 25. Because a user selects and connects to the drive control unit 25 one of the filter wheel 12 and the DIC prism 18 as one of options of the microscope 300, the filter wheel 12 and the DIC prism 18 are in an exclusive relation with each other.

According to the above described third embodiment of the present invention, depending on the optical unit to which the control unit 6 is connected, the drive signals for driving the optical unit are allocated to the respective buttons of the operation input unit 3. Accordingly, the functions of the respective buttons of the operation input unit 3 are automatically changeable.

Further, according to the third embodiment of the present invention, depending on the optical unit to which the control unit 6 is connected, allocation of the instruction signals for instructing the microscopies to the respective buttons of the operation input unit 3 is changed over. Accordingly, microscopies of the microscope 300 are automatically changeable.

Further, according to the third embodiment of the present invention, operation by the same operation input unit 3 is possible for each system. Accordingly, the number of the operation input units 3 upon extension of a system can be kept at the minimum and the operation thereof is preventable from becoming complicated.

Furthermore, according to the third embodiment of the present invention, even for an ICSI microscope, by installing an optical unit in the microscope main body 10 according to the microscopy desired by the user, the microscopy that is able to be performed by the installed optical unit is able to be carried out.

Fourth Embodiment

Next, a fourth embodiment of the present invention will be described. A microscope according to the fourth embodiment of the present invention has a configuration different from that of the microscope according to the above described third embodiment and a process thereof is different. Therefore, hereinafter, a configuration of the microscope according to this fourth embodiment is described, and thereafter, the process executed by the microscope according to the fourth embodiment is described. The same parts as those of the microscope 300 according to the above described third embodiment will be described being appended with the same reference signs.

Figure 15:
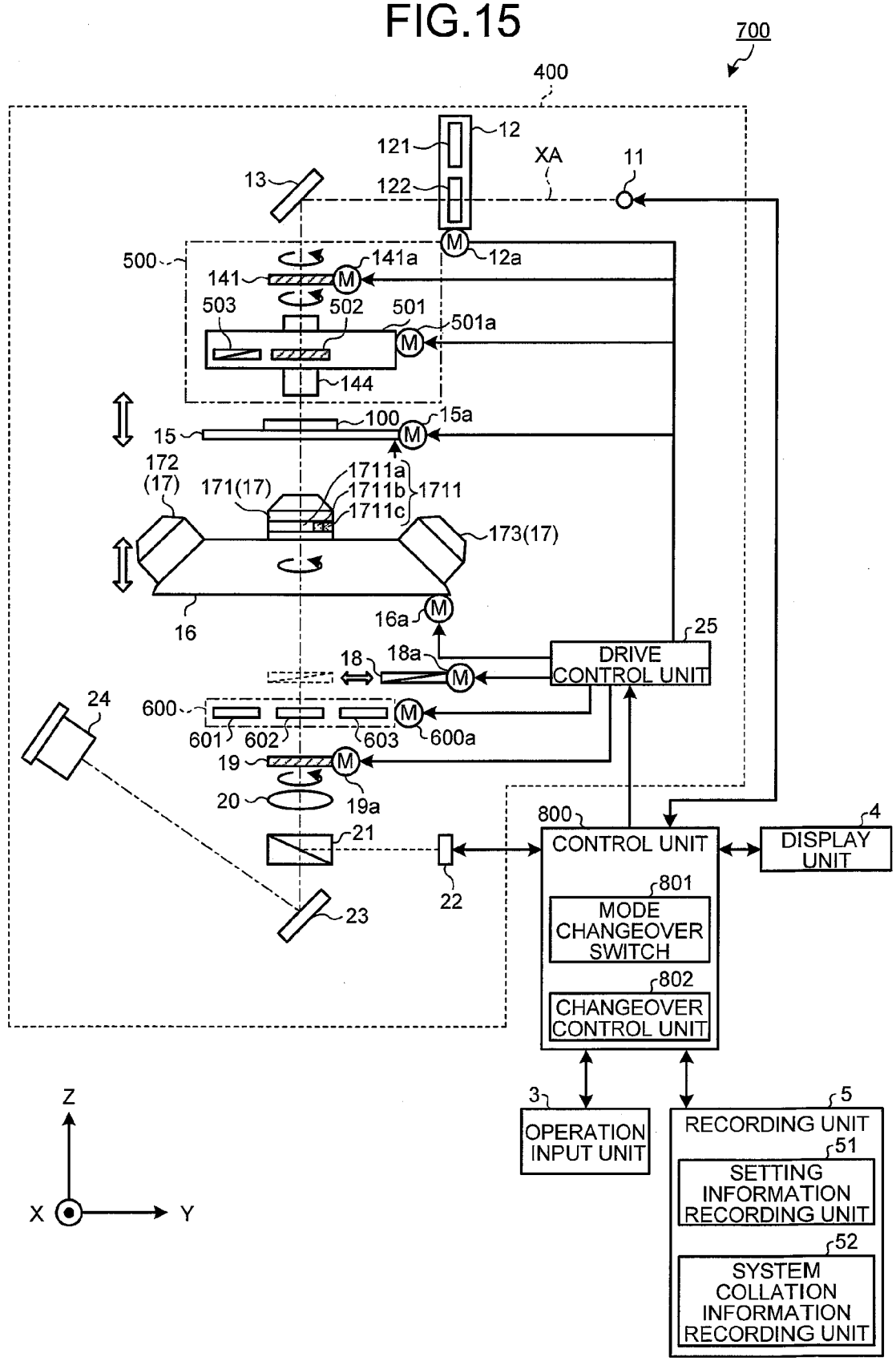
FIG. 15 is a block diagram illustrating a schematic configuration of a microscope according to a fourth embodiment of the present invention.

FIG. 15 is a block diagram illustrating a schematic configuration of the microscope according to the fourth embodiment of the present invention. A microscope 700 illustrated in FIG. 15 includes the operation input unit 3, the display unit 4, the recording unit 5, the microscope main body unit 400, and a control unit 800.

The control unit 800 is configured by using a CPU, a rotary switch, and the like and comprehensively controls operations of each unit forming the microscope 700. The control unit 800 sets functions to be allocated to the buttons B1 to B11 of the operation input unit 3 according to the type of the condenser unit 500 installed in the microscope main body unit 400. Further, the control unit 800 has a mode changeover switch 801 and a changeover control unit 802.

The mode changeover switch 801 is configured by using a rotary switch and receives input of a changeover signal for changing a mode of the microscope 700. For example, the mode changeover switch 801 inputs the changeover signal for changing the microscope 700 to an ICSI microscope or a biological microscope, according a position of the switch. In the fourth embodiment, the mode changeover switch 801 functions as a mode changeover unit.

The changeover control unit 802 changes over allocation of the optical units for which the respective buttons B1 to B11 of the operation input unit 3 receive inputs of their drive signals, according to the changeover signal input from the mode changeover switch 801. Specifically, if the changeover signal input from the mode changeover switch 801 is for ICSI, the changeover control unit 802 performs control to not receive input of an instruction signal for instructing changeover of a neutral density filter allocated to the button B10 and button B11. For example, even if the button B10 or the button B11 is manipulated by a user, the control unit 800 does not drive the filter wheel 12.

A process executed by the microscope 700 configured as above is described. FIG. 16 is a flow chart illustrating an outline of the process executed by the microscope 700.

As illustrated in FIG. 16, step S301 to step S303 respectively correspond to step S101 to step S103 described above with respect to FIG. 8.

At step S304, the changeover control unit 802 changes over the mode of the microscope 700 according to a position of the mode changeover switch 801.

According to the above described fourth embodiment of the present invention, the changeover control unit 802 restricts the function to be allocated to each button of the operation input unit 3, according to the changeover signal input from the mode changeover switch 801. Accordingly, only operational contents desired by a user are able to be reflected.

According to each of the above described embodiments, the control unit allocates the instruction signals for instructing the microscopies respectively to the buttons B1 to B5 of the operation input unit 3 and the drive signals for driving the optical units respectively to the buttons B6 to B11, but the drive signals for driving the optical units may be respectively allocated to the buttons B1 to B5 and the instruction signals for instructing the microscopies may be allocated respectively to the buttons B6 to B11. Of course, the allocation of functions of the instruction signals or the drive signals to the respective buttons B1 to B11 may be changed as appropriate.

Further, in each of the above described embodiments, the microscope including the microscope main body unit, the operation input unit, the display unit, the recording unit, and the control unit has been explained as an example, but the present invention is applicable to, for example, an imaging apparatus, e.g., a video microscope or the like, which includes an objective lens that magnifies a sample, an imaging function of forming an image of the sample via the objective lens, and a display function of displaying the image.

Further, in each of the above described embodiments, an inverted microscope apparatus used in ICSI of injecting a sperm into an egg has been explained as an example of a microscope apparatus, but an upright microscope apparatus, for example, is also applicable. Further, the present invention is also applicable to various systems including a line apparatus in which a microscope is incorporated.

Further, in each of the above described embodiments, the polarizer is rotated in order to arrange the polarizer and the analyzer in the crossed Nicols state, but a case of rotating the analyzer, for example, is also applicable. Of course, a case of rotating each of the polarizer and the analyzer is also applicable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope, comprising:
   a light source configured to generate light for irradiating a specimen;
   a microscope main body which supports the light source and on which an accommodation unit that accommodates the specimen is placed;
   a plurality of optical units, each of which is detachably installed in the microscope main body, configured to be arranged on an optical path of the light, and configured to change optical characteristics of the light incident thereon;
   an operation input unit that includes a plurality of input units configured to respectively receive inputs of drive signals for driving optical units to be controlled among the plurality of optical units; and
   a control unit configured to allocate optical units to be respectively driven with the drive signals by the plurality of input units according to the plurality of optical units installed in the microscope main body.

2. The microscope according to claim 1, wherein:
   the operation input unit further includes a plurality of microscopy input units configured to receive inputs of instruction signals for respectively instructing a plurality of microscopies executable by the microscope; and the control unit is configured to allocate the microscopies for which the plurality of microscopy input units respectively receive the inputs of the instruction signals, according to the plurality of optical units installed in the microscope main body.

3. The microscope according to claim 2, wherein the control unit is configured to allocate the microscopies for which the plurality of microscopy input units respectively receive the inputs of the instruction signals and the optical units respectively driven with the drive signals by the plurality of input units, according to connection information of a specific optical unit that changes over a mode of the microscope, the specific optical unit being one of the plurality of optical units installed in the microscope main body.

4. The microscope according to claim 2, wherein the control unit is configured to change over allocation of the optical units for which the plurality of input units respectively receive the inputs of the drive signals, according to the microscopies instructed by the instruction signals input via the microscopy input units.

5. The microscope according to claim 1, wherein the control unit includes:
- a mode changeover unit configured to receive an input of a changeover signal for changing over a mode of the microscope; and
- a changeover control unit configured to change allocation of the optical units for which the plurality of input units respectively receive the inputs of the drive signals, according to the changeover signal received by the mode changeover unit.

* * * * *